US012672638B2

(12) United States Patent
     Cropanese

(10) Patent No.:  US 12,672,638 B2
(45) Date of Patent:  Jul. 7, 2026

(54) PET ENTERTAINMENT APPARATUS

(71) Applicant: Lexis LLC, Sheridan, WY (US)

(72) Inventor: Roseann Cropanese, Flowery Branch, GA (US)

(73) Assignee: Lexis LLC, Sheridan, WY (US)

( * ) Notice: Subject to any disclaimer, the term of this patent is extended or adjusted under 35 U.S.C. 154(b) by 101 days.

(21) Appl. No.: 18/734,756

(22) Filed: Jun. 5, 2024

(65) Prior Publication Data
     US 2025/0374892 A1     Dec. 11, 2025

(51) Int. Cl.
     *A01K 15/02*     (2006.01)
(52) U.S. Cl.
     CPC ................................. *A01K 15/025* (2013.01)
(58) Field of Classification Search
     CPC ....... A01K 15/025; A63H 33/00; A63H 33/26
     USPC ............................................ 446/1, 489, 490
     See application file for complete search history.

(56) References Cited

U.S. PATENT DOCUMENTS

| | | | |
|---|---|---|---|
| 3,690,673 A | | 9/1972 | Occhipinti |
| 4,327,668 A | * | 5/1982 | Phillips ................ A01K 15/025 |
| | | | 119/707 |
| 4,534,316 A | * | 8/1985 | Bowlsby .............. A01K 15/025 |
| | | | 119/707 |

| | | | |
|---|---|---|---|
| 6,039,628 A | * | 3/2000 | Kusmiss .............. A01K 15/025 |
| | | | 446/457 |
| 7,823,541 B2 | | 11/2010 | Comerford |
| 9,592,437 B2 | | 3/2017 | Flammer |

FOREIGN PATENT DOCUMENTS

| | | |
|---|---|---|
| CN | 107912327 A | 4/2018 |
| CN | 215689819 U | 2/2022 |
| WO | 2011110814 A2 | 9/2011 |

OTHER PUBLICATIONS

Brand: Migipaws; Title:"Migipaws Cat Toys, Interactive Automatic 7 Holes Mice Whack-a-Mole, Ultra Fun Smart Teaser Toy for Indoor Cats, USB Rechargeable, 4 Pieces Feather Refills" Link: https://www.amazon.co.uk/Migipaws-Interactive-Automatic-Electric-Rechargeable/dp/B08VHCCP81?th=1.

* cited by examiner

*Primary Examiner* — Kimberly S Berona
*Assistant Examiner* — Nevena Aleksic
(74) *Attorney, Agent, or Firm* — Briggs IP; Jeremy A. Briggs

(57)     ABSTRACT

A pet entertainment apparatus is disclosed. The apparatus may include a frame, a movable unit, and a control unit. The movable unit may be configured to move within frame edges in an X-Y plane. The movable unit may include an actuation unit configured to cause an object to be pushed upwards along a Z-axis perpendicular to the X-Y plane when the actuation unit is activated. The control unit may be coupled with the movable unit and the actuation unit. The control unit may be configured to cause a movement of the movable unit in the X-Y plane and activate the actuation unit.

11 Claims, 6 Drawing Sheets

PET ENTERTAINMENT APPARATUS

TECHNICAL FIELD

The present disclosure relates to a pet entertainment apparatus.

BACKGROUND

Pets are known to be energetic, and enjoy playing with toys or chasing objects. It generally becomes difficult for pet owners to keep up and engage with their pets for long time durations, especially when the pets are young and have high energy levels. Further, it is challenging for the pet owners to keep their pets engaged when the pet owners may be away from the pets.

Thus, a system is required that entertains the pets, without requiring pet owner's involvement.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
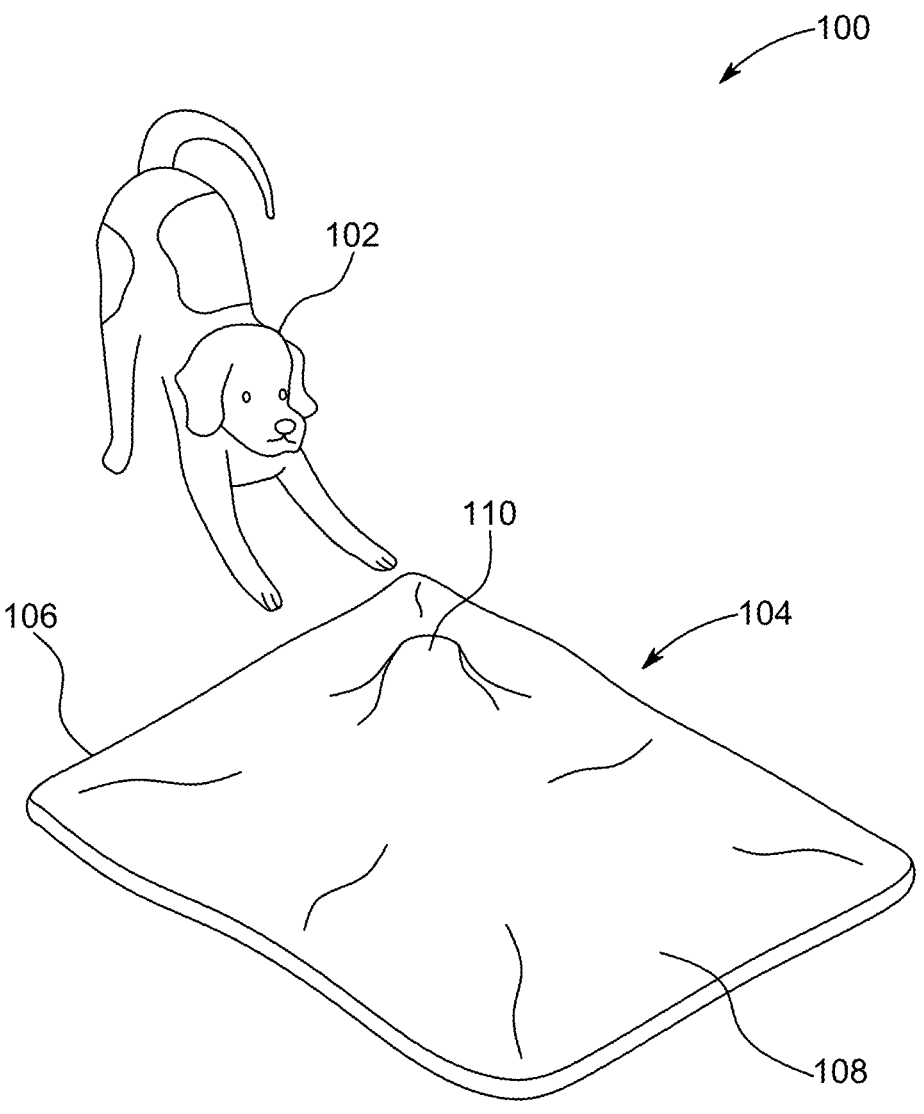
FIG. 1 depicts an environment in which techniques and structures for providing the systems and methods disclosed herein may be implemented.

The present disclosure describes a pet entertainment apparatus ("apparatus") configured to entertain and engage with a pet, without requiring pet owner's involvement. The apparatus may include a frame and a fabric layer (e.g., a blanket) disposed over the frame. The apparatus may further include one or more movable units configured to move randomly in X-Y plane within the frame underneath the fabric layer. Each movable unit may include an actuation unit that may be configured to cause an object (e.g., a ball) to move upwards in Z-axis when the actuation unit may be activated. Since the fabric layer is disposed over the frame and the movable unit moves underneath the fabric layer, the ball may contact a fabric layer bottom surface when the ball is made to move upwards, causing a portion of the fabric layer to raise. The pet, on seeing the raised fabric layer portion, may run towards the raised portion and try to "catch" the raised portion. At the same time or a predefined time duration afterwards, another actuation unit associated with a different movable unit may be activated, which may cause the ball associated with the other actuation unit to move upwards, thereby causing a different fabric layer portion to get raised. The pet may then run towards this "new" raised fabric layer portion. In this manner, different fabric layer portions may be caused to "pop-up" sequentially, which may keep the pet entertained and engaged as the pet chases the different raised fabric layer portions.

In some aspects, the ball may be attached to the actuation unit. In other aspects, the ball may be attached to an underside of the fabric layer (that faces the movable unit/actuation unit). Further, in some aspects, the actuation unit may be or include a piston, a spring, and/or a motor. In other aspects, the actuation unit may be or include an air blowing unit or an air blower that may be configured to blow air in the Z-axis when the actuation unit is activated, which causes the ball disposed above the actuation unit to move upwards (due to the force exerted by the air), thereby causing the fabric layer to raise.

In further aspects, the apparatus may include or be communicatively coupled with a pet reward device, which may be configured to provide a reward to the pet when the pet "catches" the raised fabric layer portion within a predefined time duration of the fabric layer portion being raised, thereby making the pet more engaged with the apparatus. In one exemplary aspect, the pet reward device may be a pet treat dispensing system that may dispense a treat when the pet catches the raised fabric layer portion. In another exemplary aspect, the pet reward device may be a speaker system that may output a preset congratulatory message (e.g., "Good Boy!") when the pet catches the raised fabric layer portion. In some aspects, the speaker system may output the congratulatory message in the pet owner's voice.

The present disclosure discloses a pet entertainment apparatus that entertains and engages with the pet, without requiring pet's owner involvement. Therefore, the apparatus may be used to entertain the pet even when the pet owner may be away (e.g., in the office or gone for shopping). Further, the apparatus causes the pet reward device to provide rewards to the pet when the pet catches the raised fabric layer portion, thereby keeping the pet engaged for a longer time duration. Furthermore, the apparatus is lightweight and portable, which makes it easier for the pet owner to handle and/or store the apparatus.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. FIG. 1 will be described in conjunction with FIGS. 2 and 3.

The environment 100 may include a pet 102 and a pet entertainment apparatus 104 (or apparatus 104). The pet 102 may be a dog, a cat, or any other domestic pet animal. Hereinafter, the pet 102 is referred to as dog 102. The apparatus 104 may be configured to entertain and engage with the dog 102, without requiring pet owner's involvement. Stated another way, the apparatus 104 may engage with the dog 102 even when the pet owner may be away from the dog 102/apparatus 104.

Figure 2:
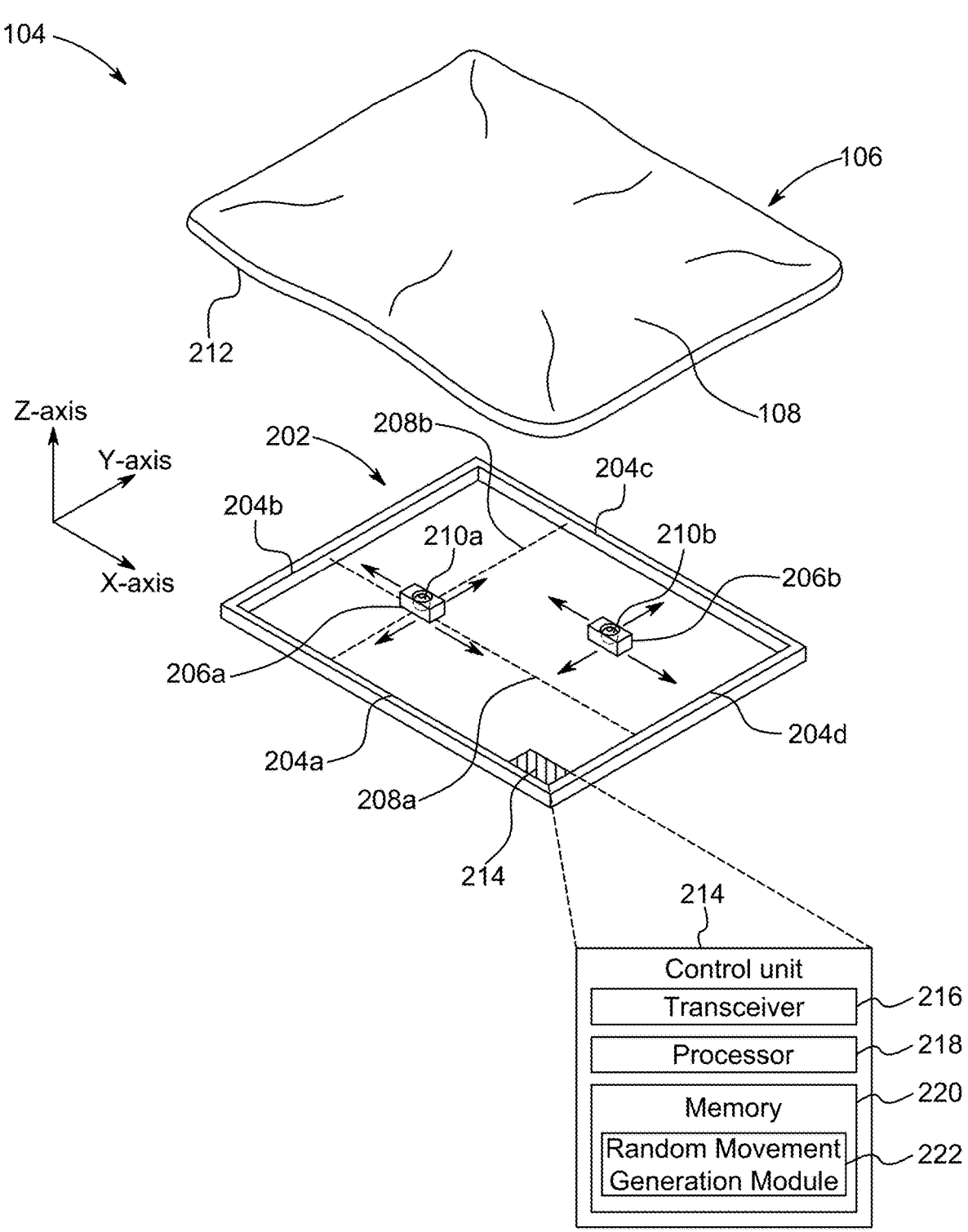
FIG. 2 depicts a first exploded view of a first example pet entertainment apparatus in accordance with the present disclosure.
Figure 3:
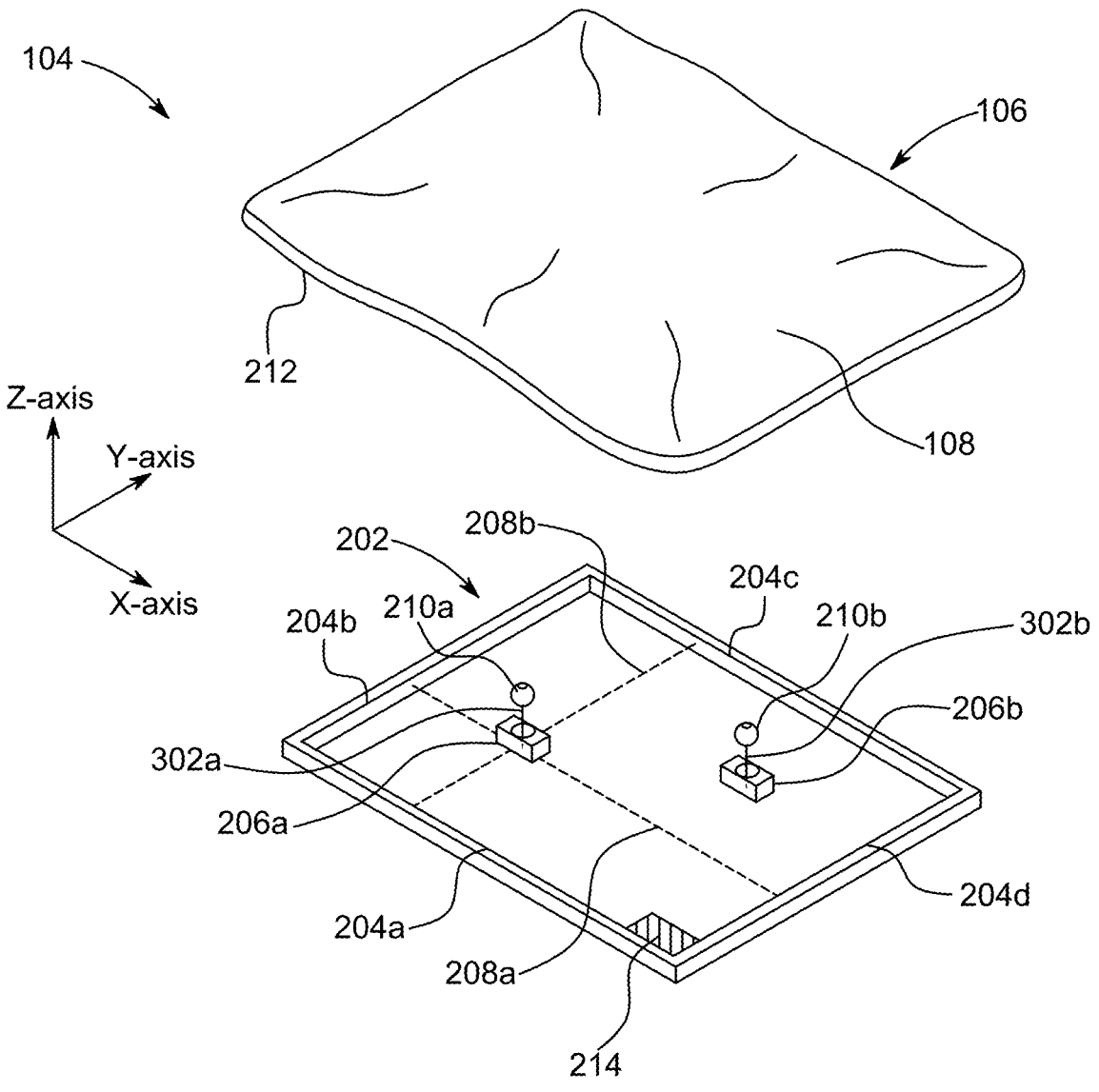
FIG. 3 depicts a second exploded view of the first example pet entertainment apparatus of FIG. 2 in accordance with the present disclosure.

The apparatus 104 may include a fabric layer 106 and a frame 202 (as shown in FIGS. 2 and 3). The frame 202 may be placed on ground. During operation of the apparatus 104, the fabric layer 106 may be disposed over or above the frame 202, so that the fabric layer 106 may completely cover the frame 202, as shown in FIG. 1. In some aspects, the fabric layer 106 may be tightly and securely attached to the frame edges, so that the fabric layer 106 may lay flush with the frame 202 and be disposed parallel to the ground surface (i.e., in X-Y plane).

The fabric layer 106 may be a flexible sheet of fabric made of any material, such as cotton, linen, spandex, Lycra, nylon, and/or the like, and may be of any color. In an exemplary aspect, the fabric layer 106 may be a blanket. Hereinafter, the fabric layer 106 is referred to as blanket 106. The blanket 106 may be rectangular, square, or may have any other shape. Further, the blanket 106 may have any dimensions. In an exemplary aspect, the blanket 106 may have a length and/or breadth in a range of 4 to 6 feet.

The frame 202 may be rectangular or square, and may have dimensions slightly less than or equivalent to the blanket's dimensions (so that the blanket 106 may completely cover the frame 202 during the apparatus operation). The frame 202 may be made of any rigid material, e.g., aluminum, steel, iron, or any other metal, plastic, etc. In an exemplary aspect, the frame 202 may include four frame edges 204a, 204b, 204c, 204d (as shown in FIGS. 2 and 3, collectively referred to as frame edges 204). Each frame edge 204 may have a cuboidal or cylindrical shape, and may have a short height (e.g., in a range of 0.25 to 1 inch) above the ground surface. Further, the frame edges 204a and 204c may be disposed parallel to each other, and may be aligned parallel to the blanket's length. Furthermore, the frame edges 204a and 204c may have equivalent lengths, which may be equivalent to or slightly less than the blanket's length.

Similarly, the frame edges 204b and 204d may be disposed parallel to each other, and may be aligned parallel to the blanket's breadth. Further, the frame edges 204b and 204d may have equivalent lengths, which may be equivalent to or slightly less than the blanket's breadth. In some aspects, the frame edges 204a, 204c may be perpendicular to the frame edges 204b, 204d.

The apparatus 104 may further include one or more movable units 206a, 206b (collectively referred to as movable unit 206) that may be configured to move within the frame edges 204 in the X-Y plane. Stated another way, the movable units 206a, 206b may move within the frame 202, and may not move/go outside the frame edges 204. The apparatus 104 may include more or less than two movable units 206 shown in FIGS. 2 and 3.

Each movable unit 206 may include a plurality of units/components (not shown) including, but not limited to, wheels, motors, one or more transceivers (to receive command signals from wired or wireless communication network/infrastructure), and/or the like, which may enable the movable unit 206 to efficiently move within the frame edges 204. The movable unit wheels may touch the ground surface, and the movable unit motors may cause the wheel rotation (based on the received command signals) to enable the movable unit movement within the frame edges 204 in the X-Y plane.

In some aspects, each frame edge 204 may include rails or tracks, and each movable unit 206 may be connected with the rails or tracks via one or more conveyor belts 208a, 208b (as shown in FIG. 2, collectively referred to as conveyor belts 208). The conveyor belts 208 may be disposed in the X-Y plane, and may be parallel to the frame 202. In an exemplary aspect, the conveyor belt 208a may be connected to the frame edges 204b and 204d, and may enable the movable unit's movement in the X-axis. Similarly, the conveyor belt 208b may be connected to the frame edges 204a and 204c, and may enable the movable unit's movement in the Y-axis. The conveyor belts 208 may enable the movable unit 206 to move in any pattern and/or to any location in the X-Y plane, within the frame edges 204.

In alternative aspects, the movable unit 206 may not be connected (directly or indirectly) with the frame edges 204, and may instead wirelessly move within the frame edges 204 without any conveyor belts (as shown by depiction of the movable unit 206b in FIG. 2). In this case, the frame edges 204 may or may not include the rails or tracks, and may simply act as a "barrier" or border beyond which the movable units 206 may not move/go.

In some aspects, each movable unit 206a, 206b may include an actuation unit 302a, 302b (shown in FIG. 3, collectively referred to as actuation unit 302) that may be configured to cause an object 210a, 210b (or object 210) to be pushed upwards along the Z-axis perpendicular to the X-Y plane, when the actuation unit 302 may be activated. In an exemplary aspect, the actuation unit 302 may be or include a piston (e.g., an air-actuated piston), a spring, and/or a motor, which may cause the object 210 to move upwards (pivotally or otherwise) along the Z-axis. The actuation unit 302 may be configured to move between a retracted position and an extended position. The actuation unit 302 may move to the extended position when the actuation unit 302 may be activated, and may return to the retracted position automatically after a predefined time duration (e.g., 0.5 to 2 seconds) of being activated. The actuation unit 302 may be completely or substantially disposed inside a movable unit body when the actuation unit 302 may be in the retracted position, and may be disposed outside the movable unit body when the actuation unit 302 may be in the extended position (as shown in FIG. 3). For example, when the actuation unit 302 may be or include a piston, the piston may be completely or substantially disposed inside the movable unit body when the actuation unit 302 may be in the retracted position, and may be disposed outside the movable unit body when the actuation unit 302 may be in the extended position.

The object 210 may be a ball or any other flexible spherical object. Hereinafter, the object 210 is referred to as ball 210. In one exemplary aspect, the ball 210 may be attached to the actuation unit 302 (or at a piston's top edge), and may get disposed fully or substantially inside the movable unit body when the actuation unit 302 may be in the retracted position (as shown in FIG. 2), and may get disposed fully outside the movable unit body in the Z-axis when the actuation unit 302 may be in the extended position (as shown in FIG. 3). Stated another way, the ball 210 may move vertically upwards along the Z-axis and away from the movable unit body when the actuation unit 302 may be in the extended position, and may get stowed inside the movable unit body when the actuation unit 302 may be in the retracted position.

In some aspects, since the blanket 106 is disposed over the frame 202, a portion of the blanket 106 may get "raised up" when the actuation unit 302 may be in the extended position.

Specifically, the blanket 106 may include a blanket top surface 108 and a blanket bottom surface 212, and the ball 210 may contact the blanket bottom surface 212 when the ball 210 moves upwards along the Z-axis when the actuation unit 302 may be in the extended position, thereby causing a portion of the blanket 106 to raise. In some aspects, the blanket bottom surface 212 may face the movable unit 206, and hence the actuation unit 302 and the ball 210 may be disposed under the blanket bottom surface 212. When the ball 210 moves upwards along the Z-axis, a blanket top portion 110 (as shown in FIG. 1) that is disposed above the ball 210 gets raised or moves up. When the dog 102 sees the "raised" blanket top portion 110, the dog 102 may run towards the blanket top portion 110 to catch/grab the blanket's raised portion.

In some aspects, two or more movable units 206a, 206b may work in tandem and/or move randomly in the X-Y plane below the blanket 106. Further, the actuation units 302a, 302b associated with the movable units 206a, 206b may get activated one-by-one, such that one actuation unit (e.g., the actuation unit 302a) may get activated a predefined time duration (e.g., 1-2 seconds) after another actuation unit (e.g., the actuation unit 302b), or may randomly get activated. Such a random movement of the movable units 206a, 206b and/or activation of the actuation units 302a, 302b may keep the dog entertained and engaged. For example, when the actuation unit 302a (associated with the movable unit 206a) is activated and the ball 210 moves up, the blanket top portion 110 may get raised, which may entice the dog 102 to run after the blanket top portion 110. When the dog 102 may be moving towards the blanket top portion 110 (e.g., to catch the blanket top portion 110) or reaches the blanket top portion 110, the actuation unit 302b (associated with the movable unit 206b, which may be disposed/moving some distance away from the movable unit 206b) may get activated and the ball associated with the actuation unit 302b may move up. At this point, another blanket top portion may get raised due to the upward movement of the ball associated with the actuation unit 302b. In parallel, at this time, the actuation unit 302a may move back to the retracted position, causing the ball 210 to move down. By seeing the other blanket portion raised up (and the blanket top portion 110 moving down), the dog 102 may then chase the other blanket portion that may be raised up. In this manner, different top portions of the blanket 106 may get raised or "popped-up" randomly, sequentially and at different locations on the blanket 106 (due to random and sequential activation of different actuation units underneath the blanket 106 and random movement of associated movable units), thereby keeping the dog 102 entertained and engaged as the dog 102 chases different raised blanket top portions one-by-one.

In some aspects, the apparatus 104 may further include a control unit 214 that may be configured to control operation of each movable unit 206 and each actuation unit 302. The control unit 214 may include a plurality of components/units including, but not limited to, a transceiver 216, a processor 218, a memory 220, and/or the like. The transceiver 216 may be configured to transmit/receive signals/information/data to/from one or more devices, e.g., a user device associated with the pet power, the movable units 206, the actuation units 302, etc., via a wired connection or a wireless network. The wireless network, as described herein, may be, for example, a communication infrastructure in which the connected devices discussed in various embodiments of this disclosure may communicate. The wireless network may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The memory 220 may store programs in code and/or store data for performing various apparatus operations in accordance with the present disclosure. Specifically, the processor 218 may be configured and/or programmed to execute computer-executable instructions stored in the memory 220 for performing various apparatus functions in accordance with the disclosure. Consequently, the memory 220 may be used for storing code and/or data code and/or data for performing operations in accordance with the present disclosure.

In one or more aspects, the processor 218 may be in communication with one or more memory devices (e.g., the memory 220 and/or one or more external databases (not shown in FIG. 2). The memory 220 may include any one or a combination of volatile memory elements (e.g., dynamic random-access memory (DRAM), synchronous dynamic random access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The memory 220 may be one example of a non-transitory computer-readable medium and may be used to store programs in code and/or to store data for performing various operations in accordance with the present disclosure. The instructions in the memory 220 may include one or more separate programs, each of which may include an ordered listing of computer-executable instructions for implementing logical functions. In some aspects, the memory 220 may include a random movement generation module 222, which may be stored in the form of computer-executable instructions, and the processor 218 may be configured and/or programmed to execute the stored computer-executable instructions for performing functions/operations in accordance with the present disclosure.

In some aspects, the control unit 214 may be communicatively coupled with the movable units 206 and the actuation units 302 via a wired connection or wirelessly via the wireless network described above. The processor 218 may be configured to execute the instructions stored in the random movement generation module 222 to generate command signals, which, when transmitted to the movable unit 206 via the transceiver 216, may cause a random movement of the movable unit 206 in the X-Y plane within the frame edges 204. A person ordinarily skilled in the art may appreciate that pets (e.g., the dog 102) typically recognize or remember patterns. Therefore, to effectively entertain and engage the dog 102, it is important that the movable unit's movement is random, so that the blanket 106 is popped-up or raised at different positions in a random manner and the dog 102 is not able to identify any pattern in the popping operation.

In some aspects, when the movable unit 206 is connected with the frame edges 204 via the conveyor belts 208, the processor 218 may cause the random movement of the movable unit 206 in the X-Y plane by causing the movable unit 206 to move on the conveyor belts 208. On the other hand, when the movable unit 206 is not connected with the frame edges 204, the processor 218 may cause the random movement of the movable unit 206 in the X-Y plane by transmitting wireless command signals to the movable unit 206 via the transceiver 216, which may cause the movable unit 206 to move. In this case, the movable unit 206 may also include a corresponding transceiver and processor (not shown), which may obtain the command signals from the transceiver 216 and cause the movable unit 206 to move based on the obtained command signals.

In further aspects, the processor 218 may be configured to activate (randomly or sequentially at a predefined frequency) each actuation unit 302 such that the ball 210 may move in the upward direction along the Z-axis, thereby causing the blanket 106 to pop-up or get raised at the blanket top portion 110, as described above. In some aspects, the processor 218 may activate the actuation units 302 such that only one actuation unit (e.g., the actuation unit 302a) is activated at a given time, and another actuation unit (e.g., the actuation unit 302b) is activated only when the actuation unit 302a moves to the retracted position. In other aspects, the processor 218 may activate the actuation unit 302b a predefined time duration after the activation of the actuation unit 302a, irrespective of the retraction status of the actuation unit 302a. In yet another aspect, the processor 218 may activate two or more actuation units simultaneously.

Although the description above describes an aspect where the processor 218 executes the instructions stored in the random movement generation module 222 to cause the random movement of the movable unit 206 in the X-Y plane, the present disclosure is not limited to such an aspect. In additional or alternative aspects, the processor 218 may cause the movable unit movement (random or otherwise) and/or cause the actuation unit activation based on user inputs or pet owner's inputs. In this case, the control unit 214 may be communicatively coupled with the user device associated with the pet owner via the wireless network described above, and may be configured to receive the pet owner's inputs (e.g., via an application ("app") being executed on the user device and/or via voice commands). Responsive to receiving the pet owner's inputs, the processor 218 may store the inputs in the memory 220, and may control the movable unit movement and/or actuation unit activation based on the inputs. For example, if the pet owner's inputs indicate that the movable unit 206a should be at a specific point "P" (not shown) within the frame 202 at a specific time "T" and the actuation unit 302a should then get activated, the processor 218 may accordingly cause the movement of the movable unit 206a and activate the actuation unit 302a.

In additional aspects, the processor 218 may be configured to automatically shut-off or switch-off the apparatus 104 if the processor 218 detects that one or more apparatus units/components (e.g., the blanket 106, the movable unit 206, and/or the like) may be broken or torn, and/or the apparatus 104 may be malfunctioning in any way. The processor 218 may also cause an emergency noise/alarm to be output from the apparatus 104 and/or an emergency signal sent to the app, responsive to determining that one or more apparatus units/components may be broken or torn, and/or the apparatus 104 may be malfunctioning in any way.

In further aspects, the processor 218 and/or the app may execute Artificial Intelligence (AI) algorithms to develop new patterns of ball movement or blanket raising patterns, so that the dog 102 does not recognize any pattern over time and is entertained by the apparatus 104 for a long time. In addition, the processor 218 and/or the app may cause different types sounds to be output by the apparatus 104 whenever the ball 210 or the blanket 106 rises. The sounds may be modified over time (e.g., one type of rodent sound to multiple types of rodent sounds, or different rodent sounds one at a time with each rise of the ball 210 or air causing the blanket 106 to rise), based on over-the-air updates received on the app.

In yet another aspect, the processor 218 may cause the ball 210 and/or the blanket 106 to vibrate at the portion where the ball 210 and/or the blanket 106 rise.

Figure 4:
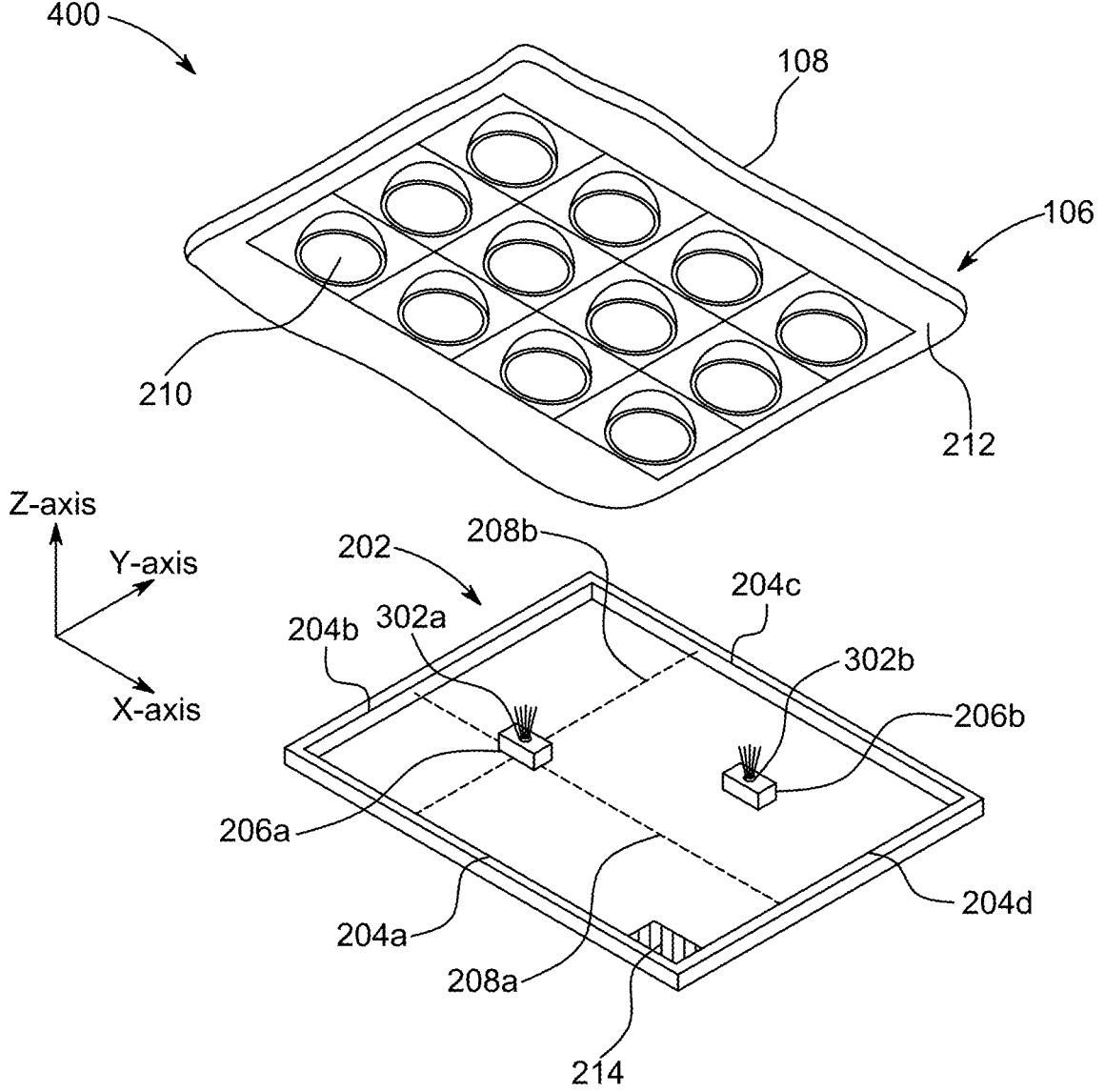
FIG. 4 depicts an exploded view of a second example pet entertainment apparatus in accordance with the present disclosure.

FIG. 4 depicts an exploded view of a second example pet entertainment apparatus 400 (or apparatus 400) in accordance with the present disclosure. The apparatus 400 may be similar to the apparatus 104 described above; however, instead of the ball 210 being attached to the actuation unit 302, the ball 210 may be part of the blanket 106. Specifically, in the apparatus 400, a grid of a plurality of balls 210 (or half-balls) may be attached to the blanket bottom surface 212 (or the underside of the blanket 106).

In some aspects, in the apparatus 400, the actuation unit 302 may be or include the piston and/or the spring, which, when activated or moved to the extended position, causes the ball 210 disposed on the blanket bottom surface 212 above the actuation unit 302 to raise, in a similar manner as described above. In alternative aspects, in the apparatus 400, the actuation unit 302 may be or include an air blowing unit or an air blower (as shown in FIG. 4) that blows air upwards along the Z-axis when the actuation unit 302 is activated. In this case, when the actuation unit 302 blows air, the ball 210 disposed on the blanket bottom surface 212 above the actuation unit 302 gets raised due to the upward force exerted by the air, thereby causing the corresponding blanket top portion to raise (in a similar manner as described above).

In yet another aspect (not shown), the balls 210 may not be attached to the blanket bottom surface 212 or the apparatus 400 may not include any balls. In this case, the blanket 106 may itself rise at the position where the actuation unit 302 blows air.

In yet another aspect (not shown), instead of having the movable units 206, the apparatus 400 may include a grid of a plurality of actuation units 302 disposed under the plurality of balls 210. In this case, the control unit 214 may activate one actuation unit at a time, and the ball disposed above the activated actuation unit may get raised, in a manner described above.

Remaining components of the apparatus 400 are similar to the components of the apparatus 104, and hence are not described again here for the sake of simplicity and conciseness.

Figure 5:
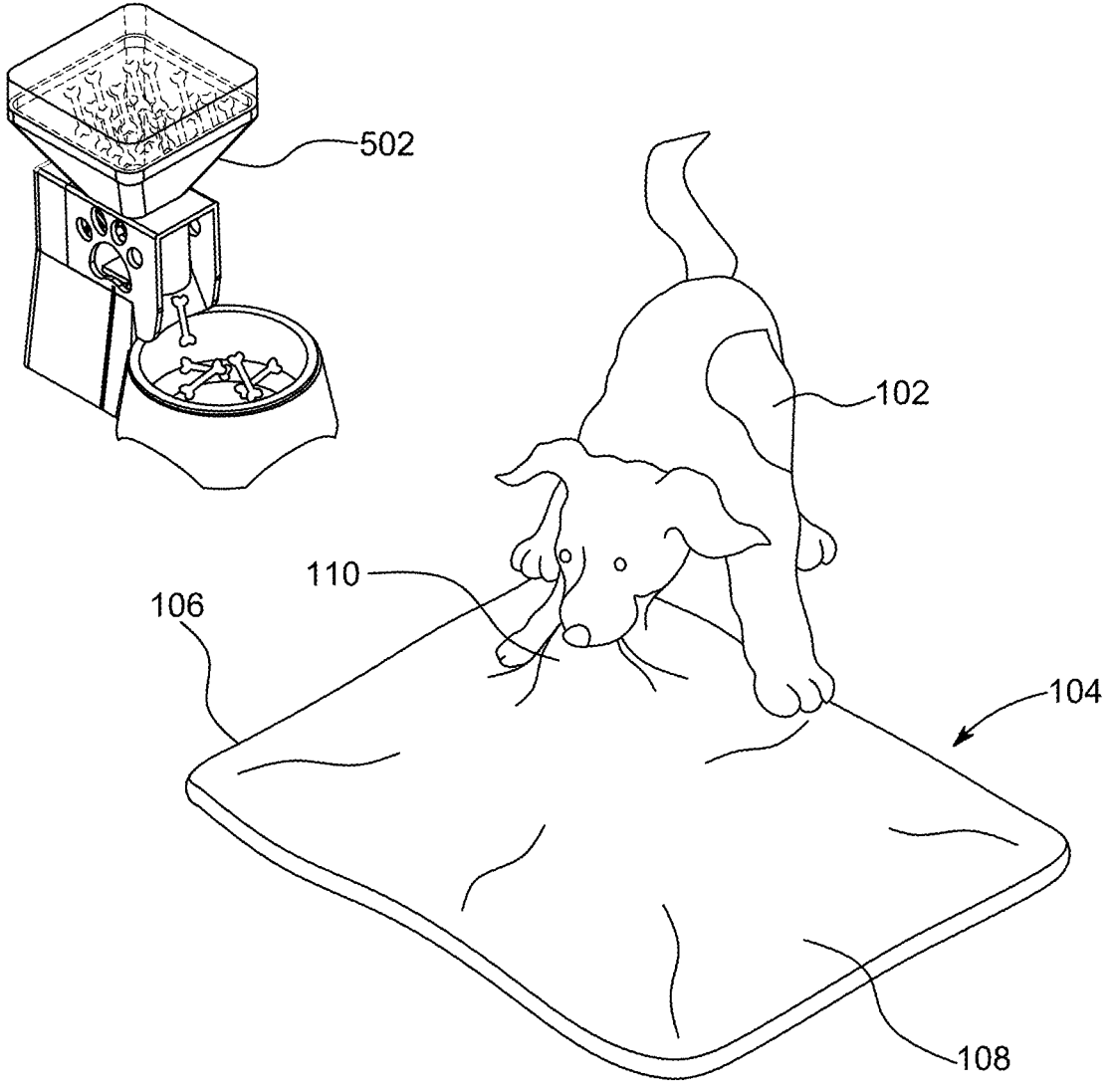
FIG. 5 depicts a view of an example pet reward device disposed in proximity to a pet entertainment apparatus in accordance with the present disclosure.

FIG. 5 depicts a view of an example pet reward device 502 disposed in proximity to the apparatus 104 in accordance with the present disclosure. As shown in FIG. 5, the dog 102 may have "caught" the blanket top portion 110, when the blanket 106 may be raised by the ball 210. In this case, the control unit 214 may be configured to determine that the dog 102 may have contacted or caught the blanket top portion 110 (e.g., based on signals obtained from one or more sensors that may be disposed on the ball 210 and/or the actuation unit 302) within a predefined time duration of the control unit 214 activating the actuation unit 302 or the ball 210 moving upwards. Responsive to such determination, the control unit 214 may transmit, via the transceiver 216 and the wireless network, a command signal to the pet reward device 502.

In some aspects, the pet reward device 502 may be part of the apparatus 104. In other aspects, as shown in FIG. 5, the pet reward device 502 may not be part of the apparatus 104 and may be disposed in proximity to the apparatus 104. In the exemplary aspect depicted in FIG. 5, the pet reward device 502 is a pet treat dispensing device; however, the present disclosure is not limited to such an aspect. In other aspects, the pet reward device 502 may be a speaker system, or any other similar device.

When the pet reward device 502 is a pet treat dispensing device, the pet reward device 502 may be configured to output a treat responsive to obtaining the command signal from the control unit 214. In this manner, the apparatus 104 and the pet reward device 502 may "reward" the dog 102 when the dog 102 catches the blanket top portion 110 within the predefined time duration, thereby making the experience of engaging with the apparatus 104 more entertaining and fun for the dog 102.

When the pet reward device 502 is a speaker, the pet reward device 502 may be configured to output a preset congratulatory message (e.g., "Good boy!") responsive to obtaining the command signal from the control unit 214. In some aspects, the congratulatory message may be pre-stored in a pet reward device memory, in the pet owner's voice.

Figure 6:
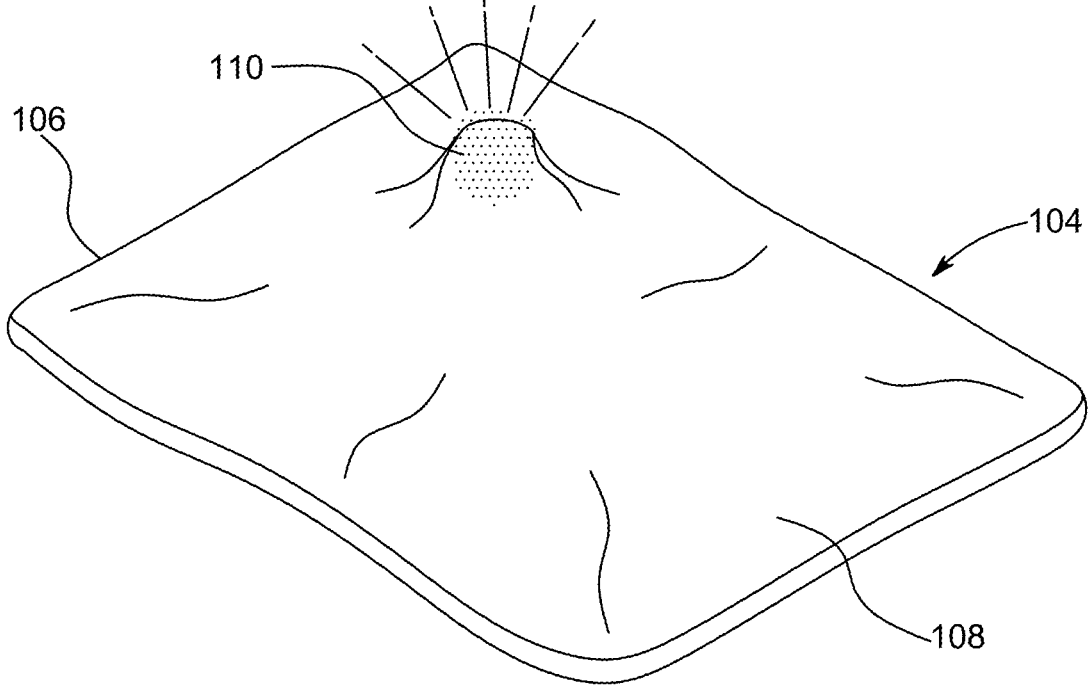
FIG. 6 depicts a view of an illuminated pet entertainment apparatus in accordance with the present disclosure.

FIG. 6 depicts a view of an illuminated pet entertainment apparatus 104 in accordance with the present disclosure. In this case, the apparatus 104 may include one or more lighting units and/or one or more speakers disposed in the blanket 106, the ball 210 or the control unit 214, which may get illuminated and/or activated (to output a preset sound) when the ball 210 contacts the blanket 106.

In one exemplary aspect, the blanket 106 may include a grid of lighting units (not shown) and/or speakers (not shown) disposed in the blanket bottom surface 212, and the control unit 214 may illuminate a lighting unit and/or activate a speaker (e.g., by transmitting a command signal to the lighting unit and/or the speaker) in proximity to the blanket top portion 110 when the ball 210 moves upwards. In another exemplary aspect, the lighting unit and/or the speaker may automatically get activated when the ball 210 contacts the blanket top portion 110 (or the lighting unit and/or the speaker).

In additional aspects (not shown), the apparatus 104 may further include a fragrance outputting unit that may output a particular smell/fragrance when the ball 210 moves upwards and/or when the control unit 214 activates the fragrance outputting unit. The fragrance outputting unit may be included in the apparatus 104 for training purpose, fun or both. The fragrance outputting unit may be specifically beneficial for a disabled dog/pet who may not be able to view the lights (e.g., if the pet is blind) or hear the sound (e.g., if the pet is deaf), but may be able to smell fragrances. In an exemplary aspect, the apparatus 104 may output lights, vibration and smell when the pet is deaf, and may output sound, vibration and smell when the pet is blind.

A person ordinarily skilled in the art may appreciate that the dog 102 may get more entertained when the blanket's raised portion is illuminated and/or is emitting sound, along with getting raised. In this manner, the experience of engaging with the apparatus 104 may be made more entertaining for the dog 102.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus comprising:
a frame;
a movable unit configured to move within frame edges in an X-Y plane, wherein the movable unit comprises an actuation unit configured to cause an object to be pushed upwards along a Z-axis perpendicular to the X-Y plane when the actuation unit is activated;
a control unit coupled with the movable unit and the actuation unit, wherein the control unit is configured to cause a random movement of the movable unit in the X-Y plane and activate the actuation unit; and
a fabric layer disposed over the frame, wherein the fabric layer comprises a top surface and a bottom surface, wherein the bottom surface faces the movable unit, wherein the object is disposed under the bottom surface, wherein a portion of the top surface disposed above the object moves upwards along the Z-axis when the object moves upwards,
wherein the control unit is further configured to:
determine that a pet has contacted the portion of the top surface within a predefined time duration of the object moving upwards; and
transmit a command signal to a pet reward device responsive to the determination.

2. The apparatus of claim 1, wherein the frame is rectangular or square.

3. The apparatus of claim 1, wherein the movable unit is wirelessly connected with the control unit, wherein the movable unit is configured to move in the X-Y plane based on command signals obtained from the control unit, and wherein the movable unit is not connected with the frame edges.

4. The apparatus of claim 1, wherein the object is a ball or a flexible spherical object.

5. The apparatus of claim 1, wherein the fabric layer is a blanket.

6. The apparatus of claim 1, wherein the object is part of the fabric layer, and is attached to the bottom surface.

7. The apparatus of claim 6, wherein the actuation unit comprises an air blowing unit that blows air along the Z-axis when the actuation unit is activated, and wherein the object is caused to move upwards due to an upward force exerted by air.

8. The apparatus of claim 1, wherein the pet reward device is a speaker configured to output a preset congratulatory message responsive to obtaining the command signal from the control unit.

9. The apparatus of claim 1, wherein the control unit is further configured to cause movement of the movable unit in the X-Y plane and activate the actuation unit based on user inputs.

10. An apparatus comprising:
a frame;
a movable unit configured to move within frame edges in an X-Y plane, wherein the movable unit comprises an actuation unit configured to cause an object to be pushed upwards along a Z-axis perpendicular to the X-Y plane when the actuation unit is activated, wherein the actuation unit comprises at least one of a piston, a spring, or a motor, and wherein the object is attached to the actuation unit;
a control unit coupled with the movable unit and the actuation unit, wherein the control unit is configured to cause a movement of the movable unit in the X-Y plane and activate the actuation unit; and
a fabric layer disposed over the frame, wherein the fabric layer comprises a top surface and a bottom surface, wherein the bottom surface faces the movable unit, wherein the object is disposed under the bottom surface, and wherein a portion of the top surface disposed above the object moves upwards along the Z-axis when the object moves upwards,
wherein the control unit is further configured to:
determine that a pet has contacted the portion of the top surface within a predefined time duration of the object moving upwards; and
transmit a command signal to a pet reward device responsive to the determination.

11. An apparatus comprising:
a frame;
a movable unit configured to move within frame edges in an X-Y plane, wherein the movable unit comprises an actuation unit configured to cause an object to be pushed upwards along a Z-axis perpendicular to the X-Y plane when the actuation unit is activated, wherein the actuation unit comprises at least one of a piston, a spring, or a motor, and wherein the object is attached to the actuation unit;
a control unit coupled with the movable unit and the actuation unit, wherein the control unit is configured to cause a movement of the movable unit in the X-Y plane and activate the actuation unit; and
a fabric layer disposed over the frame, wherein the fabric layer comprises a top surface and a bottom surface, wherein the bottom surface faces the movable unit, wherein the object is disposed under the bottom surface, wherein a portion of the top surface disposed above the object moves upwards along the Z-axis when the object moves upwards,
wherein the control unit is further configured to:
determine that a pet has contacted the portion of the top surface within a predefined time duration of the object moving upwards; and
transmit a command signal to a pet reward device responsive to the determination, wherein the pet reward device is an external pet treat dispensing device configured to output a treat responsive to obtaining the command signal from the control unit.

* * * * *